United States Patent Office 2,698,305
Patented Dec. 28, 1954

2,698,305

PROCESS FOR CONTROLLING PORE SIZE

Charles J. Plank and Sigmund J. Lukasiewicz, Woodbury, and Leonard C. Drake, Wenonah, N. J., assignors to Socony-Vacuum Oil Company, Incorporated, a corporation of New York No Drawing. Application March 23, 1951,
Serial No. 217,308

9 Claims. (Cl. 252—454)

This invention relates to a process for controlling the pore size of porous compositions made up essentially of hydrous oxides. More particularly, the present invention is concerned with a method for increasing the average pore size of porous hydrous oxides without effecting appreciable change in the density thereof.

Porous hydrous oxide compositions, such as inorganic oxide gels, gelatinous precipitates, naturally occurring deposits, activated clays, and the like, consisting essentially of one or more hydrous oxides, are widely employed in a variety of industrial operations, the more important of which generally involve adsorption and/or catalysis. Such operations invariably make use of the porous structure of the aforesaid compositions, and the effectiveness of said operations is very often directly dependent upon the porosity of the particular porous composition utilized therein.

The choice of pore size for a given porous hydrous oxide composition has heretofore been severely limited. In the case of silica, for example, gels are known with average pore diameters in the approximate range of 20 to 80 Angstrom units. Natural siliceous composites, such as diatomaceous earth, on the other hand, ordinarily have pores ranging above 500 Angstrom units in diameter. Between these pore sizes, no porous siliceous hydrous oxide material has been readily available having the mechanical stability requisite for catalysts, catalyst supports, and for use in various adsorption procedures requiring a physically rigid adsorbent. In the case of various other hydrous oxide compositions, the selective range of pore size has been even more restrictive. Thus, for hydrous aluminum oxides, including bauxite, activated alumina, and alumina gels, the range of available porosity extends only from pore diameters of from about 50 to about 120 Angstrom units. Similarly, for physically rigid silica-alumina gels, the extent of available pore diameters has been limited to the approximate range of 20 to 100 Angstrom units.

It may be noted that in certain patents to Kistler, there is described a method for making the so-called "aerogels" which brings about a variation in pore size of the gel product by varying the conditions of hydrogel treatment. Such treatment in the hydrogel stage, however, affects the density of the resultant product, yielding a gel of decreased density which does not possess the desirable high mechanical strength of the normal hydrous oxides.

It is accordingly a major object of this invention to provide a method for modifying the pore structure of porous hydrous oxide compositions to a desired average pore diameter without effecting appreciable change in the density thereof, thereby retaining the high mechanical rigidity of the unmodified porous hydrous oxide composition. A further object is the provision of a process for controlling the average pore diameter of inorganic oxide gels without decreasing the density thereof. A still further object is to provide a procedure for altering the porosity of porous hydrous oxides without altering the high mechanical strength of the normal hydrous oxides.

The above and other objects which will be apparent to those skilled in the art are achieved by the process of this invention. Broadly, the method described herein involves treatment of a porous hydrous oxide composition in the dry or calcined state with water at elevated temperatures and pressures. It has been found that by effecting such treatment of substantially dry porous hydrous oxide compositions, a product of controlled average pore size is attainable, said pore size being any desired diameter within a wide range.

The method of this invention thus comprises treatment of porous hydrous oxide compositions having the pores thereof free of liquid and occupied by the gaseous atmosphere in which the composition is contained. Under ordinary conditions, this will be air. The porous hydrous oxide composition treated in accordance with this invention may still contain a relatively small percentage of adsorbed water which is removed only by drying at elevated temperature. Alternatively, the composition may have undergone previous calcination and thus be substantially free even of such adsorbed moisture. It is essential, however, in order to achieve the objects set forth hereinabove, that the porous hydrous oxide composition undergoing treatment be substantially dry, i. e., have the pores thereof substantially free of liquid. In the case of inorganic gels, the gel will have been dried to a stage beyond that at which maximum shrinkage is obtained. Such gels, after syneresis or shrinkage thereof has been completed, are substantially dry; that is, the gel possesses open pores free of liquid although it ordinarily contains a small amount of strongly adsorbed water which is evolved by heating at a relatively high temperature.

As a general rule, the porous hydrous oxide composition being treated will initially contain pores of relatively small average diameter, usually within the range of 20 to 120 Angstrom units; although it will be understood that the present process is not restricted to materials of such initial pore size. The particular chemical composition of the hydrous oxide comprising the charge does not appear to be critical. It is accordingly contemplated that the present method is generally applicable to porous compositions wherein a hydrous oxide is the major component. Thus, the porous composition may comprise, in major proportion, one or more hydrous oxides of iron, aluminum, chromium, copper, cobalt, nickel, silver, gold, manganese, cadmium, zinc, mercury, magnesium, beryllium, lead, tin, silicon, germanium, titanium, zirconinum, thorium, vanadium, or molybdenum. From a practical standpoint, materials to which the method is most specifically applicable are hydrous oxide combinations, a major portion of which consists of hydrated silica.

The method accordingly comprises treatment of porous hydrous oxide compositions having the foregoing characteristics with water, either in the liquid or vapor phase, at elevated temperatures and pressures. Vapor phase treatment is preferred because the rate of enlargement of the pores is generally greater. Increase in temperature, pressure of water vapor, and time of treatment all tend to cause increases in average pore diameter. Broadly, the invention involves treating temperatures from about 210° F. upward, water vapor pressures from about 50 pounds per square inch upward, and treating times from about one minute upward. Preferred ranges of these variables are 400 to 900° F., 100 to 3000 pounds per square inch, and 15 minutes to 6 hours, respectively. The value of any one of these three variables to be used depends upon the material undergoing treatment, its initial pore size, the desired ultimate pore size and the values assumed for the other two of these variables. For the realization of a given average pore size, the temperature, pressure, and time to be used are mutually interdependent. Similarly, for a given porous hydrous oxide material, any desired average pore size can be obtained by variation of these three principal factors. Thus, a given pore size can be produced at any of an infinite variety of treating conditions which are mutually interrelated. As a general rule, it appears to be somewhat easier to obtain a wide range of pore sizes by varying the water vapor pressure at a given temperature than by varying the temperature at a given pressure. For small increases in pore size, control may be easiest by varying the pressure while using a temperature in the range of 400 to 500° F. and a relatively long time of one hour or longer.

Having described in a general way the nature of this invention, it may be more readily understood by reference to the illustrative but non-limiting examples set forth below. A number of the examples to be described involve treatment of a typical co-gelled commercial silica-alumina bead catalyst widely used in promoting cracking of petroleum hydrocarbons. Such co-gelled composites may be produced by the procedure of Marisic described in U. S. Patent 2,384,946. These catalysts are typically characterized by the following physical properties:

| | |
|---|---|
| Surface area, m.²/g. | 340 |
| Particle density, g./cc. | 1.18 |
| Real density, g./cc. | 2.31 |
| Pore volume, cc./g. | 0.415 |
| Average pore diameter, A° | 50 |

As indicated hereinabove and as will be apparent from specific examples given below, the particular chemical composition of the porous hydrous oxide material is not significant in achieving the desired modification of its pore structure. The porous hydrous oxide composition may be brought into contact with water in any desired manner. Thus, contact may take place under pressure in a heated bomb or in a reactor through which water is pumped or by any other feasible means. Mechanical details of carrying out the experimental examples will first be described, followed by a tabulation and discussion of the results thereby achieved.

Bomb runs were carried out in a stainless steel electrically heated rocking bomb of suitable capacity. The porous material undergoing treatment and excess water were charged to the bomb. The bomb was thereafter closed and heated to the treating temperature. Water was removed with the aid of a suitable valve arrangement to give the desired water vapor pressure. After reaching treating temperature, the bomb was held at this temperature for the desired time and the pressure was then rapidly released and the bomb cooled. Rapid release of the pressure essentially avoided further treating effect during the slow cooling of the bomb.

The measurement of pore size and pore size distribution in various porous materials is discussed in detail by L. C. Drake and H. L. Ritter in Industrial and Engineering Chemistry, Analytical Edition, Volume 17, pages 782–791 (1945). The methods described there were essentially those employed in determining average pore diameters and other pore measurements of the porous hydrous oxide compositions treated in accordance with the procedure of this invention.

In one example, a portion of co-gelled silica-alumina catalyst having the characteristics set forth above was placed directly in the liquid water contained in the bomb. Sufficient water was present to assure the maintenance of a liquid phase during the treating period. A second portion of the same catalyst was placed on a screen in the upper portion of the bomb. The first portion was thus maintained in contact with liquid during the period of treatment while the second portion came into contact only with water vapor. The bomb was maintained stationary and the time of treatment was one hour. The treating temperature was 600° F. and the pressure was 1500 pounds per square inch. At the conclusion of the treating period, the first portion of catalyst which had been in contact with liquid water during treatment was found to have a surface area of 54 square meters per gram and an average pore diameter of 305 Angstrom units. The catalyst which had been placed on the screen and had been in contact only with water vapor during the treating time was found to have a surface area of 26 square meters per gram and an average pore diameter of 630 Angstrom units. Since the untreated catalyst had a surface area of 340 square meters per gram and an average pore diameter of 50 Angstrom units, it will be apparent that the treatment either in the liquid or vapor phase gave rise to a very marked decrease in surface area and a proportional increase in pore diameter of the catalyst. It will further be noted that vapor phase treatment provided a greater increase in pore diameter than did liquid phase treatment under identical contacting conditions.

In another series of runs, the bomb was stationary and the porous solid was suspended on a screen far enough above the bottom of the bomb to avoid contact with any liquid water. The results of these examples illustrating treatment of a silica-alumina co-gelled catalyst and silica gel are reported in Table I. In every instance a substantial increase in average pore diameter of the treated gel was observed.

TABLE I

*The effect of vapor phase hydrothermal treatment of silica-alumina bead catalyst and silica gel*

[Time of treatment=1 hr.]

A. SILICA-ALUMINA BEAD CATALYST

| Run No. | Temp., °F. | Pressure, p. s. i. g. | Surface Area, (m.²/g.) | Average Pore Diameter (Angstrom Units) |
|---|---|---|---|---|
| Blank | | | 340 | 50 |
| 2 | 500 | 500 | 80 | 205 |
| 3 | 500 | 650 | 73 | 225 |
| 4 | 500 | 700 | 72 | 230 |
| 5 | 525 | 700 | 52 | 320 |
| 6 | 540 | 700 | 47 | 360 |
| 7 | 600 | 250 | 122 | 140 |
| 8 | 600 | 350 | 106 | 160 |
| 9 | 600 | 500 | 52 | 320 |
| 10 | 600 | 700 | 31 | 550 |
| 11 | 650 | 1,000 | 33 | 510 |
| 12 | 700 | 500 | 49 | 340 |
| 13 | 700 | 700 | 46 | 360 |
| 14 | 800 | 500 | 69 | 240 |
| 15 | 800 | 700 | 52 | 320 |
| 16 | 800 | 1,000 | 30 | 550 |
| 17 | 900 | 500 | 64 | 260 |
| 18 | 900 | 1,000 | 30 | 550 |
| 19 | 900 | 2,000 | 20 | 850 |

B. SILICA GEL

| Run No. | Temp., °F. | Pressure, p. s. i. g. | Surface Area, (m.²/g.) | Average Pore Diameter (Angstrom Units) |
|---|---|---|---|---|
| Blank | | | 700 | 20 |
| 20 | 500 | 600 | 174 | 85 |
| 21 | 605 | 1,500 | 75 | 200 |
| 22 | 700 | 2,000 | 61 | 250 |

In another group of experimental examples, the porous solid and water were placed together in the bottom of the bomb and the bomb was rocked. In these examples, the porous solids were in contact with both liquid and gas-phase water during at least the heating-up period. In many instances, the length of time required to reach the desired conditions of temperature and pressure was very significant in comparison to the time held at those conditions so that the period of mixed-phase contact in the rocking bomb may have made a significant contribution in achieving the desired results. In some cases, a layer of liquid water apparently was in contact with the solid throughout the time of treatment as the conditions were close to saturation. The results of these examples showing the effect of treating time, temperature and pressure, as well as treatment of alumina and silica gels, appear in Table II set forth below:

TABLE II

*Hydrothermal treatment of hydrous oxide gels by rocking bomb technique*

A. EFFECT OF TIME (SILICA-ALUMINA GEL BEADS)

| Run No. | Temp., °F. | Pressure, p. s. i. g. | Time, Hrs. | Surface Area, (m.²/g.) | Pore Vol. (cc./g.) | Average Pore Diameter (Angstrom Units) |
|---|---|---|---|---|---|---|
| 23 | 605 | 1,500 | 1 | 38 | 0.42 | 440 |
| 24 | 605 | 1,500 | 3 | 33 | 0.44 | 530 |
| 25 | 605 | 1,500 | 6 | 27 | 0.43 | 650 |

B. EFFECT OF TEMPERATURE AND PRESSURE (SILICA-ALUMINA GEL BEADS)

| Run No. | Temp., °F. | Pressure, p. s. i. g. | Time, Hrs. | Surface Area, (m.²/g.) | Pore Vol. (cc./g.) | Average Pore Diameter (Angstrom Units) |
|---|---|---|---|---|---|---|
| 26 | 500 | 500 | 1 | 94 | 0.43 | 180 |
| 27 | 700 | 250 | 1 | 101 | 0.40 | 160 |
| 28 | 700 | 500 | 1 | 52 | 0.43 | 330 |
| 29 | 700 | 700 | 1 | 39 | 0.42 | 430 |
| 30 | 700 | 1,500 | 1 | 29 | 0.42 | 570 |
| 31 | 700 | 2,000 | 1 | 26 | 0.43 | 660 |
| 32 | 800 | 250 | 1 | 78 | 0.43 | 220 |
| 33 | 800 | 700 | 1 | 35 | 0.41 | 470 |
| 34 | 800 | 1,000 | 1 | 31 | 0.43 | 550 |
| 35 | 810 | 3,000 | 1 | 23 | 0.42 | 730 |
| 36 | 900 | 3,000 | 1 | 9 | 0.42 | 1,850 |

*Hydrothermal treatment of hydrous oxide gels by rocking bomb technique—Continued*

C. MISCELLANEOUS GELS

Al₂O₃ gel

| | | | | | | |
|---|---|---|---|---|---|---|
| Blank | | | | 180 | 0.50 | 110 |
| 37 | 800 | 1,600 | 1 | 97 | 0.50 | 210 |

SiO₂ gel

| | | | | | | |
|---|---|---|---|---|---|---|
| Blank | | | | 700 | 0.36 | 20 |
| 38 | 500 | 700 | 3 | 218 | 0.38 | 70 |

In still another group of examples, water was passed over the porous hydrous oxide at treating conditions. In these runs, the porous solid was placed in a reactor of suitable capacity and water was added at the bottom of the reactor after passage through a preheater. A valve at the top of the reactor was kept closed until the desired pressure was reached and then opened to maintain this pressure. Conditions of 600° F. and 1500 p. s. i. g. were attained in about fifteen minutes. Examples conducted in the reactor under varying contacting conditions with silica-alumina gel beads are reported in Table III. Similar runs with miscellaneous porous hydrous oxide compositions are set forth in Table IV.

TABLE III

*Hydrothermal treatment of silica-alumina bead catalyst in a continuous unit*

A. EFFECT OF TEMPERATURE AND PRESSURE (TIME 1 HOUR)

| Run No. | Temp., °F. | Pressure, p. s. i. g. | Liquid Space Rate (v./v./hr.) | Surface Area (m.²/g.) | Average Pore Diameter (Angstrom Units) |
|---|---|---|---|---|---|
| 39 | 405 | 250 | 2 | 212 | 78 |
| 40 | 500 | 250 | 2 | 236 | 71 |
| 41 | 500 | 500 | 2 | 106 | 160 |
| 42 | 500 | 700 | 2 | 88 | 190 |
| 43 | 600 | 250 | 2 | 232 | 72 |
| 44 | 600 | 500 | 2 | 148 | 118 |
| 45 | 610 | 700 | 2 | 82 | 205 |
| 46 | 600 | 1,000 | 2 | 41 | 410 |
| 47 | 605 | 1,500 | 2 | 30 | 560 |
| 48 | 715 | 500 | 2 | 73 | 230 |

B. EFFECT OF H₂O SPACE RATE (TIME 1 HOUR)

| | | | | | |
|---|---|---|---|---|---|
| 49 | 500 | 700 | 2 | 88 | 190 |
| 50 | 510 | 700 | 0.5 | 91 | 185 |
| 51 | 605 | 1,500 | 0 | 28 | 600 |
| 52 | 605 | 1,500 | ½ | 30 | 560 |
| 53 | 605 | 1,500 | 2 | 30 | 560 |
| 54 | 605 | 1,500 | 2.8 | 25 | 670 |

C. EFFECT OF TIME OF TREATMENT

| | | | | | |
|---|---|---|---|---|---|
| 55 | 500 (1 hr.) | 700 | 2 | 88 | 190 |
| 56 | 500 (¼ hr.) | 700 | 2 | 113 | 145 |
| 57 | 605 (¼ hr.) | 1,500 | 2 | 35 | 480 |
| 58 | 610 (½ hr.) | 1,500 | 2 | 34 | 495 |
| 59 | 605 (1 hr.) | 1,500 | 2 | 30 | 560 |

TABLE IV

*Hydrothermal treatment of various hydrous oxide composites in a continuous unit*

[Treating conditions: 600° F., 1,500 p. s. i. g.; 1 hr.; space velocity 2]

| Run No. | Gel | Surface Area, m.²/g. | | Pore Volume, cc./g. | | Average Pore Diameter (Angstrom Units) | |
|---|---|---|---|---|---|---|---|
| | | Initial | Final | Initial | Final | Initial | Final |
| 60 | Tempered Silica-Alumina Bead Catalyst. | 340 | 30 | 0.44 | 0.42 | 52 | 560 |
| 61 | Silica-Alumina Bead Catalyst-Oven dried only. | 600 | 28 | 0.45 | 0.45 | 30 | 640 |
| 62 | Silica Gel | 700 | 69 | 0.36 | 0.38 | 20 | 220 |
| 63 | Alumina Gel | 180 | 131 | 0.50 | 0.50 | 110 | 150 |
| 64 | Silica-Zirconia Gel | 314 | 45 | 0.52 | 0.52 | 65 | 460 |
| 65 | Activated Clay Cracking Catalyst. | 230 | 144 | 0.51 | 0.50 | 90 | 140 |
| 66 | Silica-Magnesia coprecipitate (80 SiO₂-20 MgO by wt.). | 273 | 241 | 1.28 | 1.24 | 185 | 205 |

It will be evident from the foregoing results that water vapor pressure, temperature, and time of treatment are the principal variables in the treating of a particular porous hydrous oxide solid. It will further be apparent that the hydrothermal treatment described herein may be carried out with water present either in the gas phase, the liquid phase or both. In general, use of water in the vapor phase is preferable since greater enlargement of pores is thereby obtained under comparable treating conditions, and the results attained utilizing water vapor have ordinarily been found to be more reproducible. In some instances, it may be desirable to carry out the treatment in the presence of excess liquid containing desirable chemical species important to the final product.

The water vapor pressure developed during the course of treatment is an important variable in controlling the extent of modification of pore size. For example, it will be seen from the results of Example 1 and the results reported in Table I that in runs carried out at 600° F. and one hour, the average pore size of the silica-alumina gel undergoing treatment rose from 50 Angstrom units initially to 140 Angstrom units when the operating pressure was 250 pounds per square inch and to 630 Angstrom units when the pressure was 1500 pounds per square inch. From the tabulated results of Table I, it will be noted that intermediate pressures gave intermediate pore sizes. Similar trends were obtained at other temperatures. This marked effect of pressure is illustrated repeatedly at each temperature studied in Section B of Table II and Section A of Table III.

The temperature maintained during treatment is likewise an important variable but its effect is not as marked as the effect of pressure. This is readily apparent from the results set forth in Tables I, II, and III. In general, over the range from 400 to 900° F., the average pore diameter increases somewhat at a fixed time and pressure of treatment. However, in the vapor phase treatment at pressures between about 500 and about 700 pounds per square inch, maximum pore size is reached at temperatures in the range of 600 to 700° F. with further temperature increases actually causing a decrease in the pore size below this maximum. Temperatures of from about 600 to about 900° F. are especially suitable for effecting large changes in the average pore diameter. If small changes are desired, a somewhat lower temperature, in the range of 400–500° F. generally provides easier control of the pore diameter, since pore diameter varies more slowly with pressure at these lower temperatures.

The effect of time of treatment is shown by the runs tabulated in Section A of Table II and in Section C of Table III. As will be noted, the enlargement of pores is most rapid during the early part of contact. For example, at a temperature of 600° F. and a pressure of 1500 pounds per square inch, a large proportion of the change in pore structure takes place in the first fifteen minutes. However, change in porosity does thereafter continue but at a slower rate and, at six hours under the above contacting conditions, the pore diameter was appreciably larger than at three hours contact.

The effect of water flow, as will be seen from the results of Section B of Table III, was of only slight significance. It is accordingly evident from the foregoing results that the temperature, pressure, and time of treatment to be employed are the principal factors in controlling or adjusting the pore size of a given porous hydrous oxide composition and that they are mutually interdependent.

It was further found that the density of the porous hydrous oxide composition which had undergone the above-described hydrothermal treatment was essentially unchanged. This means that the pore volume of such compositions was essentially unchanged. Such fact is substantiated by the results set forth in Table II and Table IV. Since the surface area of the porous solid is diminished very readily by the hydrothermal treatment, obviously the pore size is rapidly increased at the same time. While the present invention is, of course, not to be limited by any theory, it appears that during the course of treatment, what is happening is that a porous solid with tiny voids and tiny walls between the voids is converted to a product with much larger voids and proportionally larger walls between the voids. Substantially no change in solid weight of the porous composition occurs during the course of treatment.

It will be apparent from the data of Tables II and IV that the method of this invention is applicable generally in treatment of porous hydrous oxide compositions. As will be seen, the particular chemical composition of the porous hydrous oxide solid being treated is not a matter of significance. Likewise, the method of this invention is applicable not only in treatment of inorganic oxide gels but also in treatment of gelatinous precipitates, activated clays, and naturally occurring hydrous oxide materials. Thus, in addition to silica-alumina gel, treatment of silica gel, alumina gel, silica-zirconia gel, an activated clay, and a silica-magnesia coprecipitate are specifically illustrated. In each case, the total pore volume was essentially unchanged and the average pore diameter sharply increased by hydrothermal treatment.

It will be understood that the porous hydrous oxide compositions treated in accordance with this invention are substantially dry, the pores thereof being free of liquid and occupied by gas. The composition need not but may, if desired, be calcined prior to treatment. As a general rule, the calcined material is slightly less susceptible to change in porosity than the oven dried material under comparable treating conditions. This will be evident from a comparison of Runs No. 60 and No. 61.

The resulting products treated in accordance with the method described herein have been found to be particularly valuable as improved catalysts for the conversion of petroleum hydrocarbons. Thus, a silica-alumina gel catalyst treated by the instant procedure showed improved regenerability and an increase in gasoline/coke ratio when subjected to Cat-A testing.

The operation of the regenerability test is as follows:

Fifty cubic centimeters (packed volume) of the catalyst to be tested are placed in an electrically heated glass tube. A standard cracking stock (pressed distillate from a paraffinic-mixed base crude; A. P. I. gravity=30.5; boiling range=600–700° F.) is vaporized and passed through the catalyst bed at 900° F. and at a liquid hourly space rate of 0.6 until a carbonaceous deposit of 22±2 grams per liter of catalyst has been laid down. After purging the vapors from the system, the temperature of the catalyst is raised to 1000±5° F., and air is passed through the bed at a rate of 600 cubic centimeters (measured at room conditions) per minute.

The regeneration is carried out at this rate until 85 per cent of the deposit has been burned off. The time required to remove this amount of catalyst deposit is a direct measure of the rate of carbon burn-off. The rate of carbon burn-off is compared with those from two standard catalysts, one of which (a silica-alumina bead catalyst having a bulk density of 1.0) has been assigned an arbitrary regenerability index of 0 and the other (an activated clay) a regenerability index of 100. The regenerability index is then defined as follows:

R. I. = $\dfrac{\text{time for zero standard} - \text{time for unknown}}{\text{time for zero standard} - \text{time for 100 standard}} \times 100$ The Cat-A method of testing is described by Alexander and Shimp in National Petroleum News, Volume 36, page R–537, August 2, 1944. Such method was employed in testing silica-alumina gel catalysts treated in accordance with the hydrothermal procedure of this invention. The results obtained are set forth in Table V below:

TABLE V

|  | Blank [1] | Catalyst A [2] | Catalyst B [3] |
|---|---|---|---|
| Bulk Density | 0.73 | 0.79 | 0.78 |
| Gas Gravity | 1.56 | 1.46 | 1.46 |
| Gas, Wt. Percent | 9.9 | 8.7 | 3.3 |
| Coke, Wt. Percent | 3.8 | 3.3 | [4] 1.1 |
| Gasoline (Vol. Percent at 410° F., no loss) | 43.9 | 40.2 | 27.8 |
| Gasoline/Coke Ratio | 11.5 | 12.2 | [4] 25.3 |
| Regenerability Index | 87 | 92 | [5] 94 |

[1] Blank = Silica-alumina bead cracking catalyst (91% SiO$_2$ and 9% Al$_2$O$_3$).
[2] Catalyst A = Blank hydrothermally treated 1½ hours at 345° F. in liquid phase water at a pressure of 750 p. s. i. g.
[3] Catalyst B = Blank treated like catalyst A but at 450° F.
[4] Normal coke make for bead catalyst at this activity level = 1.4, resulting in a gasoline/coke ratio of 19.9.
[5] The regenerability index does not vary markedly with activity and thus would be about 87 for normal bead catalyst of this activity.

From the above results, it will be apparent that a porous hydrous oxide catalyst which has undergone treatment of the present invention is improved in regard to regenerability and gasoline/coke ratio.

We claim:

1. A method for modifying the porosity of a porous hydrous oxide composition without effecting appreciable change in the density thereof, comprising contacting a substantially dry porous hydrous oxide composition with water vapor at a temperature between about 400 and about 900° F. and a pressure between about 100 and about 3000 pounds per square inch for a period of between about 15 minutes and 6 hours.

2. A method for effecting small increases in pore size of a porous hydrous oxide composition without effecting appreciable change in the density thereof, comprising contacting a substantially dry porous hydrous oxide composition with water vapor at a temperature in the range of 400 to 500° F. and a pressure between about 100 and about 3000 pounds per square inch for a period of at least one hour.

3. A process for modifying the pore structure of a porous inorganic oxide gel without effecting appreciable change in the density thereof, comprising contacting a substantially dry inorganic oxide gel with water vapor at a temperature between about 400 and about 900° F. and a pressure between about 100 and about 3000 pounds per square inch for a period of between about 1 minute and 6 hours.

4. A method for modifying the pore structure of an inorganic oxide gel without effecting appreciable change in the density thereof, comprising contacting an inorganic oxide gel, initially containing pores of average diameter in the range of 20 to 120 Angstrom units and which has been dried to a stage beyond that at which maximum shrinkage is obtained, with water vapor at a temperature in the range of 400 to 500° F. and a pressure between about 100 and 3000 pounds per square inch for a period of at least one hour and thereafter removing the treated gel from contact with the water vapor.

5. A method for increasing the average pore diameter of a porous hydrous oxide composition initially containing pores of relatively small average pore diameter without effecting appreciable change in the density thereof, which comprises bringing said porous hydrous oxide composition, the pores of which are substantially free of liquid, into contact with water vapor at a temperature of between about 400 and about 900° F. and a pressure between about 100 and about 3000 pounds per square inch for a period of time of between about 1 minute and 6 hours.

6. A method for increasing the average pore diameter of a porous hydrous oxide composition containing hydrated silica as its major component without effecting appreciable change in the density thereof, which comprises bringing said composition in a substantially dry state into contact with water vapor at a temperature of between about 400 and about 900° F. and a pressure between about 100 and about 3000 pounds per square inch for a period of between about 15 minutes and 6 hours and thereafter removing said composition from contact with the water vapor.

7. A method for treating a substantially dry hydrous oxide composition, which comprises bringing the same into contact with water vapor at a temperature in the range of 400 to 900° F. and a pressure in the range of 100 to 3000 pounds per square inch for a period of time between about 1 minute and about 6 hours so as to effect a substantial increase in the average pore diameter thereof without effecting appreciable change in density.

8. A method for treating an inorganic oxide gel previously dried to a stage beyond that at which maximum shrinkage occurs, which comprises bringing said gel into contact with water vapor at a temperature in the range of 400 to 900° F. and a pressure in the range of 100 to 3000 pounds per square inch for a period of time between about 1 minute and about 6 hours so as to effect a substantial increase in the average pore diameter of said gel without effecting appreciable change in the density thereof.

9. A process for modifying the pore structure of a porous inorganic oxide gel without effecting appreciable change in the density thereof, comprising contacting a substantially dry inorganic oxide gel with water vapor at a temperature between about 600 and 700° F. and a pressure between about 500 and about 700 pounds per square inch for a period of between about 1 minute and about 6 hours.

References Cited in the file of this patent

UNITED STATES PATENTS

| Number | Name | Date |
|---|---|---|
| 2,378,155 | Newsome et al. | June 12, 1945 |
| 2,420,049 | Martin | May 6, 1947 |
| 2,477,664 | Shabaker | Aug. 2, 1949 |
| 2,477,695 | Kimberlin | Aug. 2, 1949 |
| 2,489,334 | Shabaker | Nov. 29, 1949 |
| 2,495,723 | Hormann | Jan. 31, 1950 |